United States Patent [19]

Hirose et al.

[11] Patent Number: 4,923,927
[45] Date of Patent: May 8, 1990

[54] CURABLE COMPOSITION

[75] Inventors: Toshifumi Hirose; Katsuhiko Isayama, both of Hyogo, Japan

[73] Assignee: Kanegafuchi Kagaku Kogyo Kabushiki Kaisha, Osaka, Japan

[21] Appl. No.: 278,504

[22] Filed: Dec. 1, 1988

[30] Foreign Application Priority Data

Dec. 5, 1987 [JP] Japan .................................. 62-308318

[51] Int. Cl.$^5$ ................................................ C08F 8/00
[52] U.S. Cl. ..................................... 525/100; 524/858; 524/588
[58] Field of Search ................. 525/100; 524/858, 588

[56] References Cited

U.S. PATENT DOCUMENTS 4,665,127  5/1987  Hirose et al. .......................... 525/100

FOREIGN PATENT DOCUMENTS 0173303  3/1986  European Pat. Off. .

Primary Examiner—Melvyn I. Marquis
Assistant Examiner—Karen Hellender
Attorney, Agent, or Firm—Armstrong, Nikaido Marmelstein, Kubovcik & Murray

[57] ABSTRACT

A curable composition comprises 100 parts by weight of an oxyalkylene polymer having at least one silicon-containing group which has a hydroxyl or hydrolyzable group attached to silicon atom and which is crosslinkable by forming a siloxane linkage and from 0.1 to less than 10 parts by weight of a liquid diene polymer.

10 Claims, No Drawings

CURABLE COMPOSITION

FIELD OF THE INVENTION

The present invention relates to a composition curable by moisture, etc. at room temperature yielding a rubbery cured substance. More particularly, the invention relates to a curable composition comprising an oxyalkylene polymer having a silicon-containing group which has a hydroxyl or hydrolyzable group attached to a silicon atom (hereinafter referred to as a reactive silicon functional group) and which is crosslinkable by forming a siloxane linkage.

BACKGROUND OF THE INVENTION

Oxyalkylene polymers having at least one reactive silicon group in the molecule are well known. The polymers are curable at room temperature yielding a rubbery substance and are used as a sealant and the like.

Of these polymers, polyoxypropylene having terminal methoxysilyl groups has already been industrially produced (trade name: MS Polymer of Kanegafuchi Chemical Industry Co., Ltd.). The cured oxyalkylene polymers having a reactive silicon functional group are rubbery substances preferably free of surface tack, and this property is especially important where the polymers are used as a sealant. This is because dust or dirt is apt to adhere to the surface where the surface is tacky. The drawback of the oxyalkylene polymers having a reactive silicon group, however, is that these polymers can produce cured substances having a tacky surface.

SUMMARY OF THE INVENTION

After a diligent study to ease the problem of tacky surface (to reduce the tack) of oxyalkylene polymers, the present inventors have achieved the objective of the present invention by admixing the polymer with a liquid diene polymer.

The present invention relates, therefore to a curable composition comprising 100 parts (by weight and the same hereinafter) of an oxyalkylene polymer, having at least one silicon-containing group which has a hydroxyl or hydrolyzable group attached to the silicon atom and which is crosslinkable by forming a siloxane linkage, and from 0.1 to less than 10 parts of a liquid diene polymer.

DETAILED DESCRIPTION OF THE INVENTION

An oxyalkylene polymer having at least one reactive silicon functional group in its molecule [this polymer is hereinafter referred to as oxyalkylene polymer (A)] is used in the present invention, and examples of oxyalkylene polymer (A) are proposed in U.S. Pat. Nos. 3,971,751, 3,979,384, and 4,323,488, incorporated herein by reference and JP-B-45-36319, JP-B-46-12154 and JP-B-49-32673, as well as in JP-A-50-156599, JP-A-51-73561, JP-A-54-6096, JP-A-55-82123, JP-A-55-123620, JP-A-55-125121, JP-A-55-131022, JP-A-55-135135 and JP-A-55-137129, incorporated herein by references. (The terms "JP-A" and "JP-B" as used herein mean an "unexamined published Japanese patent application" and an "examined Japanese patent publication", respectively.)

The molecular chain of the oxyalkylene polymer (A) preferably has a recurring unit that is represented by the general formula:

$$-R^1-O-$$

where $R^1$ is a divalent hydrocarbon group having 1 to 8 carbon atoms, preferably hydrocarbon groups having 3 or 4 carbon atoms. It is preferable that the sum of the recurring units: $-R^1-O-$ oxyalkylene polymer (A) exceeds 50 wt %, specifically 70 wt % of said polymer. Specific examples of $R^1$ include:

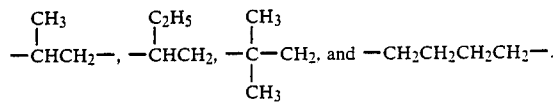

The molecular chain of the oxyalkylene polymer (A) may be composed of recurring units of a single type of two or more different types. A particularly preferred example of $R^1$ is

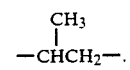

The reactive silicon functional groups in oxyalkylene polymer (A) that are capable of crosslinking by forming siloxane bonds, are well-known in the art and are characterized by their ability to crosslink even at room temperature. Typical examples of such reactive silicon functional groups are represented by the general formula (I):

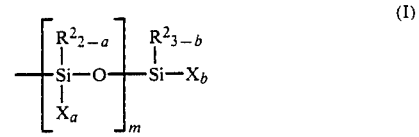

where $R^2$ is a substituted or unsubstituted monovalent organic group having 1 to 20 carbon atoms which may be the same or different; X is a hydroxyl or hydrolyzable group; a is 0, or an integer of 1 or 2; b is 0, or an integer of 1, 2 or 3, with the proviso that (the sum of a and b)$\geq 1$ and preferably (the sum of a and b)$\leq 4$; and m is 0 or an integer of 1 to 19, however, not all of the m units

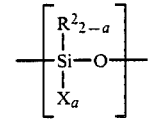

are necessarily the same.

Reactive silicon functional groups which are preferred for such reasons as economy are represented by the general formula (II)

where $R^2$, X and b are the same as defined above.

Specific examples of the hydrolyzable group X in the general formula (I) include a halogen atom, a hydrogen atom, an alkoxy group, an acyloxy group, a ketoximate group, an amino group, an amido group, an acid amide group, an aminooxy group, a mercapto group and an alkenyloxy group. Among these examples, alkoxy groups such as methoxy and ethoxy are preferred since they will undergo mild hydrolysis.

Specific examples of $R^2$ in the general formula (I) include alkyl groups having 1 to 20 carbon atoms such as methyl and ethyl; cycloalkyl groups having 3 to 20 carbon atoms such as cyclohexyl; aryl groups having 6 to 20 carbon atoms such as phenyl; and aralkyl groups having 7 to 20 carbon atoms such as benzyl. In formula (I) or (II) $R^2$ may be a triorganosiloxy group represented by the following general formula:

$$(R')_3SiO—$$

where the R' groups are substituted or unsubstituted monovalent organic groups, preferably hydrocarbon groups having 1 to 20 carbon atoms, such as a methyl group, a phenyl group, etc., provided that the three R' groups are not necessarily the same. A particularly preferred example of $R^2$ in formula (I) or (II) is methyl.

In order to ensure satisfactory curability, the oxyalkylene polymer (A) preferably contains at least 1, more preferably at least 1.1, and most preferably 1.5 to 4 reactive silicon functional groups on average. Such reactive silicon functional groups are preferably present at terminals of the molecular chain of the oxyalkylene polymer (A).

The oxyalkylene polymer (A) has a number average molecular weight which preferably ranges from 500 to 30,000, more preferably from 3,000 to 15,000. Oxyalkylene polymers (A) may be used either alone or in combination.

The oxyalkylene polymer (A) may be prepared by performing an addition reaction between a hydrosilyl compound having a structural formula with a hydrogen atom attached to the group represented by the general formula (I) and an oxyalkylene polymer having an olefin group represented by the general formula (III)

$$CH_2=\overset{R^3}{\underset{|}{C}}-R^4-(O)_c— \quad (III)$$

(where $R^3$ is a hydrogen atom or a substituted or unsubstituted monovalent organic group having 1 to 20 carbon atoms; $R^4$ is a divalent organic group having 1 to 20 carbon atoms; and c is 0 or 1) in the presence of a catalyst, such as a platinum compound, made from a transition metal of group VIII.

Other methods for preparing the oxyalkylene polymer (A) are described below:

(1) reacting a hydroxyl-terminated polyoxyalkylene with a polyisocyanate compound such as toluene diisocyanate to form an isocyanate-terminated alkylene oxide polymer, and subsequently reacting the terminal isocyanate group with a W group in a silicon compound represented by general formula (IV):

$$W—R^4—\overset{R^2_{3-b}}{\underset{|}{Si}}—X_b \quad (IV)$$

where W is an active hydrogen containing group selected from among a hydroxyl group, a carboxyl group, a mercapto group and an amino group (primary or secondary); and b, $R^2$, $R^4$ and X are each the same as defined above;

(2) performing an addition reaction between an olefin group in an olefin-containing polyoxyalkylene polymer represented by formula (III) and a mercapto group is a silicon compound of formula (IV) where W is a mercapto group; and (3) reacting a hydroxyl group in a hydroxyl terminated polyoxylkylene polymer with a compound represented by general formula (V):

$$OCN—R^4—\overset{R^2_{3-b}}{\underset{|}{Si}}—X_b \quad (V)$$

where $R^2$, $R^4$, X and b are each the same as defined above. It should, however, be noted that the oxyalkylene polymer (A) may be prepared by other methods.

In the preparation of an oxyalkylene polymer (A) part or all of the X group in the reactive silicon functional group may be converted to other hydrolyzable groups or to a hydroxyl group.

If the X group is a halogen atom or a hydrogen atom, it is preferably converted to an alkoxy, acyloxy, aminoxy, alkenyloxy, hydroxyl group, or some other similarly behaving group.

In the general formula (III), $R^3$ is a hydrogen atom or a substituted or unsubstituted monovalent organic group of 1 to 20 carbon atoms, and is preferably a hydrogen atom or a hydrocarbon group, with the former being particularly preferred. In formula (III), $R^4$ is a divalent organic group having 1 to 20 carbon atoms, and is preferably $$—R^5—, \quad —R^5OR^5—, \quad —R^5—O\overset{O}{\underset{\|}{C}}—, \quad —R^5NH\overset{O}{\underset{\|}{C}}—, \quad or \quad —R^5\overset{O}{\underset{\|}{C}}—$$

(where $R^5$ is a hydrocarbon group having 1 to 10 carbon atoms), with methylene group being particularly preferred. The olefin containing alkylene oxide polymer may be prepared by various methods such as a method in which olefin groups are introduced into hydroxyl terminated polyoxyalkylene polymers by using ether, ester, urethane or carbonate linkages disclosed in JP-A-54-6097, and a method in which an epoxy compound such as ethylene oxide or propylene oxide, is polymerized with an olefin-containing epoxy compound such as allyl glycidyl ether producing an alkylene oxide polymer having an olefin group is side chain.

In the present invention, a liquid diene polymer is used to ease the problem of tack which is apt to remain when the oxyalkylene polymer is cured. The liquid diene polymer contributes to the reduction of the remaining tack of the composition of the present invention, because a cured substance is formed by an oxidative crosslinking of the diene polymer by the action of air.

Examples of suitable liquid diene polymers include polymers which are obtained by polymerizing or copolymerizing diene compounds such as butadiene, chloroprene, isoprene, 1,3-pentadiene, etc., polymers such as nitrile-butadiene rubber(NBR), styrene-butadiene rubber(SBR) and the like which are obtained by copolymerizing the above-mentioned diene compounds with copolymerizable monomers such as acrylonitrile, styrene and the like in a manner such that the sum of the recurring units based on diene monomers constitutes a major portion, preferably 50 wt % or more, in the resultant copolymers, and, in addition, various modified products of the above polymers (products modified by maleic acid or boiled oil etc.). These polymers may be used alone or in combination.

Of these liquid diene polymers, preferred is a liquid polybutadiene. Of the diene polymers, as compared with 1,4-polydiene, 1,2-polydiene has an advantage in that it does not cause phase separation during storage because of its better compatibility with oxyalkylene polymers and because it contributes to better weathering resistance without discoloration of the cured substance. The most preferred is 1,2-polybutadiene.

The use ratio of a liquid diene polymer is, based on 100 parts of the oxyalkylene polymer (A), from 0.1 to less than 10 parts, preferably from 1 to 8 parts. Where the liquid diene polymer is used in amount of less than 0.1 part, the reduction of remaining tack, that is the objective of using the liquid diene polymer, is insufficient, whereas an amount of in excess of 10 parts impairs tensile properties or weathering resistance, etc. of the curd substance.

As for the manufacturing method of the present composition which comprises the oxyalkylene polymer (A) and a liquid diene polymer, there is no specific limitation. One of the examples is a simple addition of a liquid diene polymer to an oxyalkylene polymer (A). In this case, it is only required to obtain a uniform dispersion and dissolution of the two by adjusting conditions such as heating, stirring and the like depending on the properties, etc. of the liquid diene polymer. However, perfect transparency of the product is not necessary, because the objective is sufficiently achieved if a uniform dispersion is obtained even though the product is non-transparent. Dispersion improving agents such as surface active agents may be used as such necessity arises.

Another method of manufacturing the composition of the present invention is to admix a predetermined amount of a liquid diene compound with a composition comprising the oxyalkylene polymer at the time of end use of the composition. For example, where the composition is used as a two-component sealant, the oxyalkylene polymer (A), the liquid diene polymer, and, as necessary, a curing catalyst, etc. are admixed at the time of application.

Examples of curing catalysts which may be employed include titanates such as tetrabutyl titanate, tetrapropyl titanate and the like; organo-tin compounds such as dibutyl tin dilaurate, dibutyl tin maleate, dibutyl tin diacetate, tin octylate, tin naphthenate and the like; lead ocytlate; amine compounds such as butylamine, ocylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 1,8-diazabicyclo(5,4,0)-undecene-7(DBU) and the like or salts thereof with carboxylic acid and the like; lower molecular weight polyamide resins obtainable from excessive amounts of polyamines and polybasic acids; reaction products from excessive amounts of polyamines and epoxy compounds; amino group bearing silane coupling agents—i.e., known silanol condensation catalysts such as γ-aminopropyltrimethoxysilane, N-(β-aminoethyl)aminopropylmethyldimethoxysilane, etc. These may be used alone or in combination.

There may be added to the composition of the present invention an additive for improving tensile property and the like, a reinforcing or non-reinforcing filler, a plasticizer, an adhesion promoter, an antisagging agent, a coloring material, an antioxidant, a flame retardant, etc.

Examples of the additives for improvement of tensile property and the like include various silane coupling agents, such as compounds which contribute to the reduction of the hardness and thereby to the elongation of the cured substrate—i.e., a silicon compound having one silanol group in the molecule or a silicon compound capable of producing, after hydrolysis, a compound having one silanol group in the molecule, and which contribute to the increase of the hardness of the cured substane—i.e., a silicon compound having no less than three silanol groups in the molecule or a silicon compound capable of producing after hydrolysys, a compound having no less than three silanol groups in the molecule.

Other compounds usable as additives are functional group-bearing dialkoxysilanes such as dimethyldimethoxysilane, γ-glycidoxypropylemthyldimethoxysilane, N-(β-aminoethyl)aminopropylmethyldimethoxysilane, γ-mercaptopropylmethyldimethoxysilane and the like, functional group-bearing diisopropenoxysilanes such as dimethyldiisopropenoxysilane, γ-glycidoxypropylmethyldiisopropenoxysilane and the like, silicon varnishes and polysiloxanes, etc.

Examples of the compounds which increase elongation while reducing hardness of cured substances include those disclosed in JP-A-61-34066, etc. such as:

(CH$_3$)$_3$SiOH,
(C$_6$H$_5$)$_2$Si(CH$_3$)OH,
(CH$_3$)$_2$Si(C$_6$H$_5$)OH,

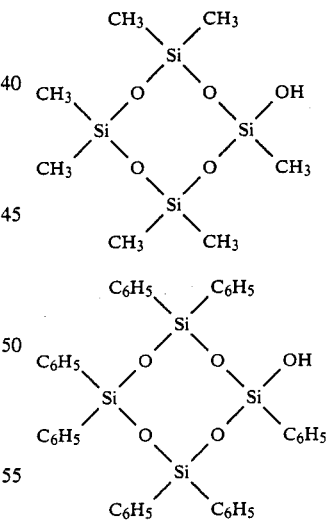

(CH$_3$)$_3$SiOCH$_3$, (CH$_3$)$_3$SiOCH$_2$CH$_3$,
(CH$_3$)$_3$SiOC$_6$H$_5$, (CH$_3$)$_3$SiNSi(CH$_3$)$_3$,
                                  |
                                  H

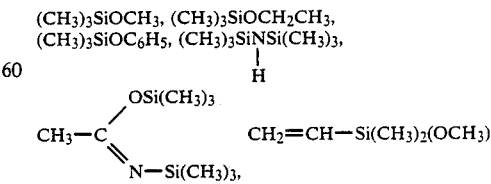

Examples of additives to increase the hardness of the cured substances include methyltrimethoxysilane, n-propyltrimethoxysilane, methyltriisopropenoxysilane, γ-glycidoxypropyltrimethoxysilane, vinyltrimethoxysilane, γ-aminopropyltrimethoxysilane, γ-mercaptopropyltrimethoxysilane and the like, although the additives are not limited to those enumerated.

Examples of fillers are ordinary ones which include light and heavy calcium carbonates; calcium carbonates whose surface has been treated with such materials as fatty acids, resinous acids, cationic surface active agents, anionic surface active agents and the like; magnesium carbonate; talc; titanium dioxide; barium sulfate; alumina; powders of metals such as aluminum, zinc, iron and the like; bentonite; kaoline clay; fumed silica; quartz powder; white carbon; carbon black; asbestos; and glass fiber.

Sealants of excellent transparency can be obtained by use of transparent fillers such as fumed silica in particular. The above filler may be used alone or in combination.

Examples of plasticizers which are used for adjustment of properties of the composition or the cured product of the composition include: phthalates such as dibutylphthalate, dihepthlphthalate, di(2-ethylhexyl)phthalate, butylbenzylphthalate and butylphthalylbutylglycolate; esters of dibasic nonaromatic acids such as dioctyladipate and dioctylsebacate; esters of polyalkylene glycols such as diethyleneglycol dibenzoate and triethyleneglycol dibenzoate; phosphates such as tricresyl phosphate and tributylphosphate; chlorinated paraffins; and hydrocarbon oils such as alkyldiphenyl and partially hydrogenated terphenyl. These may be used alone or in combination, but they are not essential. They may be incorporated at the time when the polymers are produced.

Since the oxyalkylene polymer (A) itself has excellent adhesion to glass, other ceramics, metals, etc. and may be bonded to a further wide range of materials where primers are used, the addition of adhesion promoters is not essential. However, bond strength to other various substrates can be enhanced by use of, as an adhesion promoter, one or two or more of epoxy resins, phenolic resins, silane coupling agents already described as additives, alkyltitanates, aromatic polyisocyanates and the like.

Examples of antisagging agents include derivatives of hydrogenated castor oil, metallic soaps such as calcium stearate, aluminum stearate, barium stearate and the like, although these are unnecessary depending on the purpose of use of the composition and fillers to be incorporated therein.

Usable as the coloring materials are ordinary inorganic pigments, organic pigments, dyes and the like.

Usable as antioxidants are ordinary antioxidants, ultraviolet absorbers and the like.

For such purpose as improving the workability or reducing the viscosity of the composition of the present invention, solvents may be incorporated, which include aromatic hydrocarbon solvents such as toluene, xylene and the like; esters such as ethyl acetate, butyl acetate, amyl acetate, cellosolve acetate and the like; and ketones such as methylethyl ketone, methylisobutyl ketone, diisobutyl ketone and the like.

Where the compound of the present invention is used, for example as a sealant, the sealant may be prepared either as a one-component sealant wherein all the ingredients have been previously incorporated and kept in an air-tight container so that the composition cures after application by absorbing moisture from the air or as a two-component type which comprises a hardener component wherein ingredients such as curing catalysts, fillers, plasticizers, water and the like have been admixed in advance so that said hardener component is mixed with the polymer component before application.

In the case of a one-component type sealant, since all the ingredients are previously admixed, it is preferable that water-containing ingredients undergo pretreatment by water removal-drying before incorporation or by the water removal preformed in the stage of mixing-kneading by, for example, employing a vacuum.

In the case of two-component type sealant, since curing catalysts are not admixed with the base component comprising the oxyalkylene polymer (A), the presence of some amount of water causes hardly any gelation of the composition. However, for long time storage stability, it is preferable to carry out water removal drying of the ingredients.

Suitable methods of water removing-drying of solid materials are heating and those for liquid materials are application of vacuum or use of chemicals such as synthetic zeolites; active alumina and silica gel. Alternatively, a small amount of an isocyanate compound can be incorporated in order to remove water as a reaction product between the isocyanate compound and water.

In addition to such water removing and drying methods, storage stability is further increased by incorporation of lower alcohols, such as methanol, ethanol and the like, and of alkoxysilanes, such as n-propyltrimethoxysilane, vinylmethyldimethoxysilane, γ-mercaptopropylmethyldimethoxysilane, γ-mercaptopropylmethyldiethoxysilane and γ-glycidoxypropyltrimethoxysilane.

The curable compositions obtainable in the abovementioned manner are usable as adhesives, paints, sealants, water repellents, spraying materials, mold materials, rubbery casting materials, etc. Particularly useful is the application as a sealant.

Illustrating the present invention in embodiments are the following examples and comparative examples which are not to be construed as limiting the scope thereof.

EXAMPLES 1 to 12 AND COMPARATIVE EXAMPLE 1

100 g of a propylene oxide polymer having on average two methyldimethoxysilyl ($-Si(CH_3)(OCH_3)_2$) groups per one molecule and an average molecular weight of 9,600 was admixed with liquid polybutadiene and a sensitizer (Irgacure-651) in amounts as shown in Table 1, then the mixture was further admixed with 150 g of a hard calcium carbonate (trade name "CCR" of Shiraishi Industry, Co., Ltd.), 65 g of dioctylphthalate, 1 g of an antioxidant based on a hindered phenolic compound (trade name "Nocrack NS-6 of Ohuchi Shinkoh Kagaku Co., Ltd.), 3 g of tin (II) octylate and 1 g of laurylamine. After sufficient mixing by 3-pass milling on a small roller for paint, the mixture was made into sheets of 3 mm in thickness. After cure at 23° C. and 50% RH, the sheets were exposed outdoors (at an inclination of 45° C. facing south) to observe the degree of dust collection. The remaining tack was evaluated by touch of finger on the surface of two series of samples of one day cure and 7-day cure each.

The results of the Examples are shown in Table 1 together with the results of Comparative Example 1 where no liquid polybutadiene was incorporated.

In Table 1 NISSO PB B-1000 is a liquid 1,2-polybutadine of a number average molecular weight of 1,050, NISSO PB B-3000 is a liquid 1,2-polybutadiene of a number average molecular weight of 3,000, NISSO PB G-1000 is a liquid 1,2-polybutadiene of a number average molecular weight of 1,350 having a hydroxyl groups at both ends, and NISSO PB TE-2000 is a liquid 1,2-polybutadiene having ends modified with acrylic groups (all of which are manufactured by Nippon Soda Co., Ltd.). Meanwhile, Polyoil LCB 110 is a liquid 1,4-polybutadiene of a number average molecular weight of 1,600, and Polyoil LCB 130 is a liquid 1,4-polybutadiene of a number average molecular weight of 3,000 (both of which are manufactured by Huels).

In Table 1, ratings of dust collection denote:
A: Dust scarcely adheres,
B: Dust slightly adheres, and
C: Dust adheres;
while ratings by touch of remaining tack denote:
A: No tack at all,
B: Slight tack,
C: Tacky, and
D: Very tacky.

TABLE 1

| Example No. | 1 | 2 | 3 | 4 | 5 | 6 | 7 | 8 | 9 | 10 | 11 | 12 | Comparative Example 1 |
|---|---|---|---|---|---|---|---|---|---|---|---|---|---|
| Liquid Polybutadiene (g) | | | | | | | | | | | | | |
| NISSO PB B-1000 | 3 | 5 | 8 | — | — | — | — | — | 5 | — | — | — | — |
| NISSO PB B-3000 | — | — | — | 5 | — | — | — | — | — | — | — | — | — |
| NISSO PB G-1000 | — | — | — | — | 5 | — | — | — | — | — | — | — | — |
| NISSO PB TE-2000 | — | — | — | — | — | 5 | — | — | — | 5 | — | — | — |
| polyoil LCB-110 | — | — | — | — | — | — | 5 | — | — | — | 5 | — | — |
| polyoil LCB-130 | — | — | — | — | — | — | — | 5 | — | — | — | 5 | — |
| Sensitizer (g) | | | | | | | | | | | | | |
| Irgacure 651 | — | — | — | — | — | — | — | — | 0.5 | 0.5 | 0.5 | 0.5 | — |
| Dust Collection (Outdoor exposure) | | | | | | | | | | | | | |
| After one Month | B | A | A | A | A | A | A | A | A | A | A | A | B |
| After two Months | B | A | A | A | A | A | A | A | A | A | A | A | C |
| Remaining Tack | | | | | | | | | | | | | |
| Matured in one day | C | B | B | B | B | B | B | B | B | B | B | B | D |
| Matured in seven days | A | A | A | A | A | A | A | A | A | A | A | A | B |

The results in Table 1 indicate that the incorporation of liquid polybutadienes improves the properties with respect to dust collection and remaining tack.

EXAMPLES 13 TO 24 AND COMPARATIVE EXAMPLE 2

The procedure of Examples 1 to 12 were repeated except that first 100 g of a mixture of a propylene oxide polymer having on average 2.7 dimethoxysilyl (Si(CH$_3$) (OCH$_3$)$_2$) groups per one molecule and an average molecular weight of 10,000 and 3 g of an additive, C$_6$H$_5$OSi(CH$_3$)$_3$, which decreases hardness and thereby increases elongation, was stirred for 2 hours at 80° C. and then there were added to 100 g of said mixture liquid polybutadienes and the sensitizer in amount as shown in Table 2.

The results are shown in Table 2.

TABLE 2

| Example No. | 13 | 14 | 15 | 16 | 17 | 18 | 19 | 20 | 21 | 22 | 23 | 24 | Comparative Example 2 |
|---|---|---|---|---|---|---|---|---|---|---|---|---|---|
| Liquid Polybutadiene (g) | | | | | | | | | | | | | |
| NISSO PB B-1000 | 3 | 5 | 8 | — | — | — | — | — | 5 | — | — | — | — |
| NISSO PB B-3000 | — | — | — | 5 | — | — | — | — | — | — | — | — | — |
| NISSO PB G-1000 | — | — | — | — | 5 | — | — | — | — | — | — | — | — |
| NISSO PB TE-2000 | — | — | — | — | — | 5 | — | — | — | 5 | — | — | — |
| polyoil LCB-110 | — | — | — | — | — | — | 5 | — | — | — | 5 | — | — |
| polyoil LCB-130 | — | — | — | — | — | — | — | 5 | — | — | — | 5 | — |
| Sensitizer (g) | | | | | | | | | | | | | |
| Irgacure 651 | — | — | — | — | — | — | — | — | 0.5 | 0.5 | 0.5 | 0.5 | — |
| Dust Collection (Outdoor exposure) | | | | | | | | | | | | | |
| After one Month | B | A | A | A | A | A | A | A | A | A | A | A | B |
| After two Months | A | A | A | A | A | A | A | A | A | A | A | A | B |
| Remaining Tack | | | | | | | | | | | | | |
| Matured in one day | B | B | B | B | B | B | B | B | B | B | B | B | B |
| Matured in seven days | A | A | A | A | A | A | A | A | A | A | A | A | A~B |

The results in Table 2 indicate that the same improvements as in Examples 1 to 12 are still obtained despite incorporation of C$_6$H$_5$OSi(CH$_3$)$_3$.

While the invention has been described in detail and with reference to specific embodiments thereof, it will be apparent to one skilled in the art that various changes and modifications can be made therein without departing from the spirit and scope thereof.

What is claimed is:
1. A composition curable to a substantially tack-free condition comprising; 100 parts by weight of an oxyalkylene polymer having at least one silicon-containing group which has a hydroxyl or hydrolyzable group attached to a silicon atom and which is crosslinkable by forming a siloxane linkage, and a tack reducing amount, from 0.1 to less than 10 parts by weight, of a liquid diene polymer.

2. The composition of claim 1 wherein the oxyalkylene polymer has a main chain consisting essentially of a recurring unit represented by the formula:

$$-R^1-O-$$

where $R^1$ is a divalent hydrocarbon group having 1 to 8 carbon atoms.

3. The composition of claim 1 wherein the silicon-containing group is represented by the general formula (I)

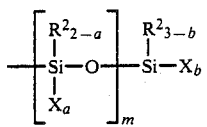

(I)

wherein $R^2$ is a substituted or unsubstituted monovalent organic group having 1 to 20 carbon atoms, and in case two or more $R^2$ groups are present, they may be the same or different; X is a hydroxyl or hydrolyzable group, and in case two or more X groups are present, they may be the same or different; a is 0, 1 or 2; b is 0, 1, 2 or 3, with the proviso that $> 1$ and that a is the same or different in each unit of the formula

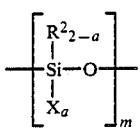

and m is 0 or an integer of 1 to 19 inclusive.

4. A composition of claim 3 wherein X is selected from the group consisting of a hydrogen atom, a halogen atom, a hydroxyl group, and alkoxy group, an acyloxy group, a ketoximate group, an amino group, an amido group, an aminooxy group, a mercapto group and an alkenyloxy group; and wherein, when two or more X groups are present, they may be the same or different.

5. The composition of claim 3 wherein X of the general formula (I) is an alkoxy group.

6. The composition of claim 3 wherein X in the general formula (I) is a methoxy group.

7. The composition of claim 1 wherein the liquid diene polymer is a liquid polybutadiene.

8. The composition of claim 7 wherein the liquid polybutadiene is a liquid 1,2-polybutadiene.

9. A composition curable sealant to a substantially tack-free condition comprising; 100 parts by weight of an oxyalkylene polymer having at least one silicon-containing group which has a hydroxyl or hydrolyzable group attached to a silicon atom and which is crosslinkable by forming a siloxane linkage, and a tack reducing amount, from 0.1 to less than 10 parts by weight, of a liquid diene polymer.

10. A substantially tack-free sealant comprising the product of moisture curing a composition comprising 100 parts by weight of an oxyalkylene polymer having at least one silicon-containing group which has a hydroxyl or hydrolyzable group attached to a silicon atom and which is crosslinkable by forming a siloxane linkage, and a tack reducing amount, from 0.1 to less than 10 parts by weight, of a liquid diene polymer.

* * * * *